(No Model.)
A. KOEPOEL.
ELECTRICAL MEASURING INSTRUMENT.
No. 494,961. Patented Apr. 4, 1893.
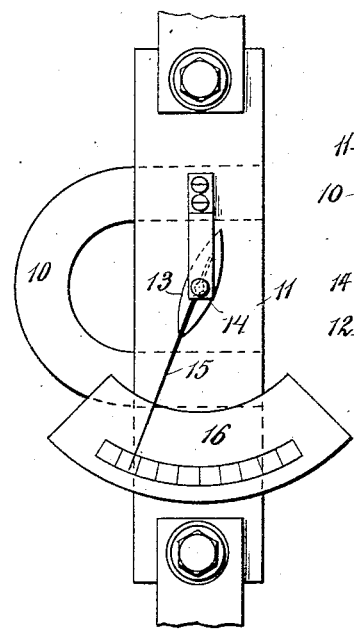
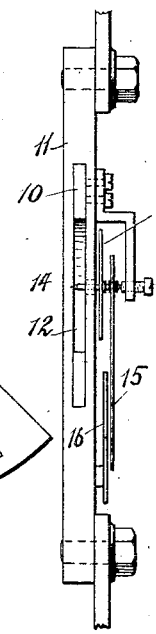
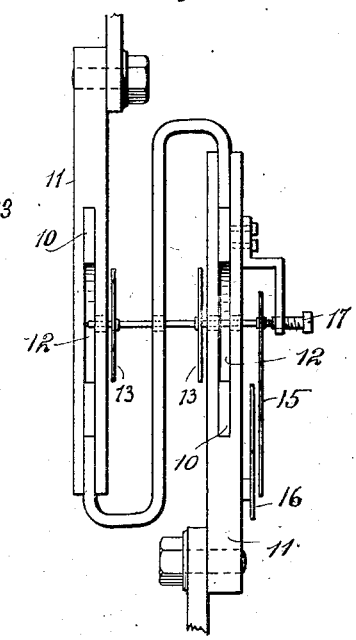
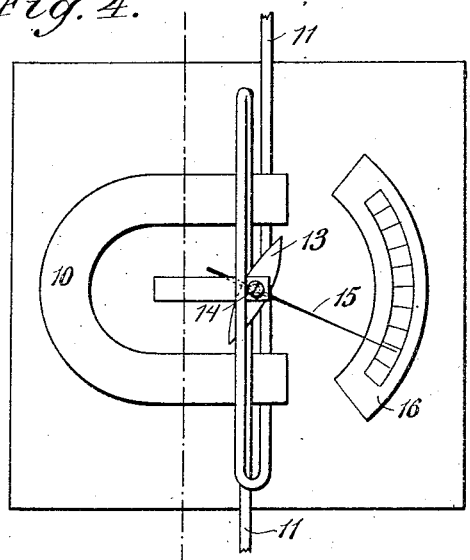
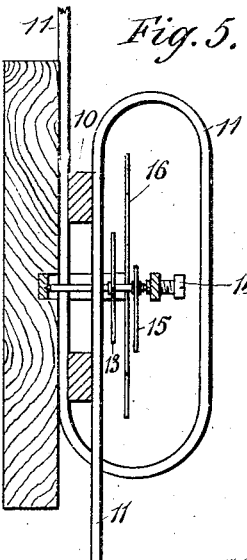
WITNESSES:
William Patten
Timothy F. Dillon
INVENTOR
Adolf Koepoel
BY
Geo. H. Benjamin
ATTORNEY.

UNITED STATES PATENT OFFICE.

ADOLF KOEPOEL, OF BERLIN, GERMANY, ASSIGNOR TO SIEMENS & HALSKE, OF SAME PLACE.

ELECTRICAL MEASURING-INSTRUMENT.

SPECIFICATION forming part of Letters Patent No. 494,961, dated April 4, 1893.

Application filed November 17, 1892. Serial No. 452,276. (No model.)

*To all whom it may concern:*

Be it known that I, ADOLF KOEPOEL, a subject of the King of Prussia and German Emperor, residing at the city of Berlin, Kingdom of Prussia, German Empire, have invented new and useful Improvements in Electrical Measuring-Instruments, of which the following is a specification.

My invention relates to electrical measuring instruments.

Measuring instruments for electrical currents, whose needle system consists of a magnetized needle, suffer from the disadvantage that the needle is easily demagnetized by too strong a current, or is rendered entirely unmagnetic. Efforts have been made to eliminate this defect by replacing the magnetized needle by a needle of soft iron, which is magnetized from the outside by the influence of a permanent or an electro-magnet. It is found in practice, however, that this arrangement is not entirely free from the influence of currents of high potential, as the permanent magnets employed are magnetized transversely by the current to be measured, and thereby the axis of the magnetic field polarizing the needle is reversed, and the zero position of the needle changed. The sensitiveness of the instrument is thereby altered, and its indications cannot be relied upon.

My invention consists in a special arrangement of the magnets polarizing the iron needle, and by reason of this, the detrimental influence of powerful currents is obviated.

In my construction, the magnets are placed in such a position relative to the conductor of the current to be measured that they are not at all magnetized by the transmitted current. This effect is obtained by causing the current to flow in the same direction on both sides of the polar ends of the magnet, so that the magnetizing effect of the current flowing in each conductor is compensated on the magnet.

In the accompanying drawings which illustrate my invention, similar figures of reference indicate like parts.

Figure 1 is a front elevation of a current meter, constructed according to my invention. Fig. 2 is a vertical section. Fig. 3 is also a vertical section, showing a modification: and Figs. 4 and 5 are respectively a front elevation and a vertical section of a modification arranged for weak currents.

In the drawings, 10 represents a permanent magnet of the horse-shoe type; 11, a conductor through which the current to be measured is carried through the instrument.

In Fig. 2, the conductor 11 is shown as provided with a slot 12, within which the polar ends of the magnet 10 are located.

13 represents a magnetic needle, pivoted at 14.

15 is a pointer attached to the needle, and 16 is a scale over which the pointer moves. The needle 13 is normally held in its zero position by the influence of the permanent magnet 10. The current to be measured flows through the conductor 11. The lines of force produced by the current transmitted through the conductor 11 are perpendicular to the axis of the magnetized iron needle, in its position of rest, and therefore produce a deviation of this needle, dependent upon the direction and intensity of the current transmitted. The extent of the deviation is measured by the pointer 15 moving over the empirically marked scale 16. The needle will deviate to one side or the other of the scale in accordance with the direction of the current transmitted through the instrument.

It will be observed that the current, in the conductor 11, flows on both sides of the legs of the polarizing magnet, and hence the current does not in any wise affect the action of the magnet, and the instrument, even if traversed by abnormally strong currents, does not lose its sensitiveness. If it is desired that the instrument also be insensible to magnetic influences, independent of those excited by the current transmitted, (astatic influences) it is preferably constructed as shown in Fig. 3,— which is nothing more nor less than a duplication of the instrument shown in Figs. 1 and 2, the conductors 11 being so united that they are traversed by the same current in the same direction. In this construction, two needles 13 are shown as mounted upon the same shaft 17, and are oppositely magnetized by the respective magnets 10, while but a single pointer 15 is employed, which moves over the scale 16. The transmitted current always, for reasons which will be readily understood, turns the two needles in the same direction.

Figs. 4 and 5 show a measuring instrument for weaker currents, based upon the same principle, which can, for instance, also be used to measure the electro motive force of the current. It differs from the form shown in Figs. 1, 2, and 3 only in that the parts of the conductor 11, which lie to both sides of the polar ends of the magnet 10, are not located parallel, but follow one another. It is evident that instead of using a permanent magnet 10, suitably excited electro-magnets may be employed.

I do not limit myself to the precise construction shown and described as many changes may be made therein without departing from the intent of my invention.

I claim—

1. In a current measuring instrument, the combination with a divided conductor, of a magnet having its poles located between the divisions of the conductor, a soft iron needle pivotally supported between the poles of said magnet, a pointer, and a scale over which the pointer travels.

2. In a current measuring instrument, the combination with a divided conductor, of a magnet having its poles located between the divisions of the conductor, a soft iron needle pivotally supported between the poles of said magnet and so that the lines of force produced by the current in the conductor will be perpendicular to the axis of said needle, a pointer, and a scale over which the pointer travels.

3. In a current measuring instrument, the combination of a magnet, a conductor for conveying the current to be measured located on each side of the poles of said magnet, a soft iron needle pivotally supported between the poles of said magnet and normally held in its zero position by the influence of said magnet, a pointer, and a scale over which the pointer travels.

4. A current measuring instrument, comprising a magnet, a soft iron needle pivotally supported between the poles of said magnet, a pointer, a scale, and means for conveying the current to be measured through the instrument in the same direction on each side of the magnet, whereby the magnetizing influence of the magnet upon the soft iron needle will not be affected by the current transmitted.

In testimony whereof I have affixed my signature in the presence of two witnesses.

ADOLF KOEPOEL.

Witnesses:
GUSTAV STEUZEL,
MAX WAGNER.

Affidavit having been filed showing that the name of the patentee in Letters Patent No. 494,961, granted April 4, 1893, for an improvement in "Electrical Measuring Instruments" should have been written and printed *Adolph Koepsel* instead of "Adolph Koepoel," it is hereby certified that the proper correction has been make in the files and records pertaining to the case in the Patent Office, and should be read in the Letters Patent that the same may conform thereto.

Signed, countersigned, and sealed this 13th day of June, A. D. 1893.

[SEAL.]

JNO. M. REYNOLDS,
*Assistant Secretary of the Interior.*

Countersigned:

JOHN S. SEYMOUR,
*Commissioner of Patents.*